Jan. 30, 1923.
P. MacGAHAN.
ELECTRICAL PROTECTIVE DEVICE.
FILED MAR. 13, 1918.
1,443,583
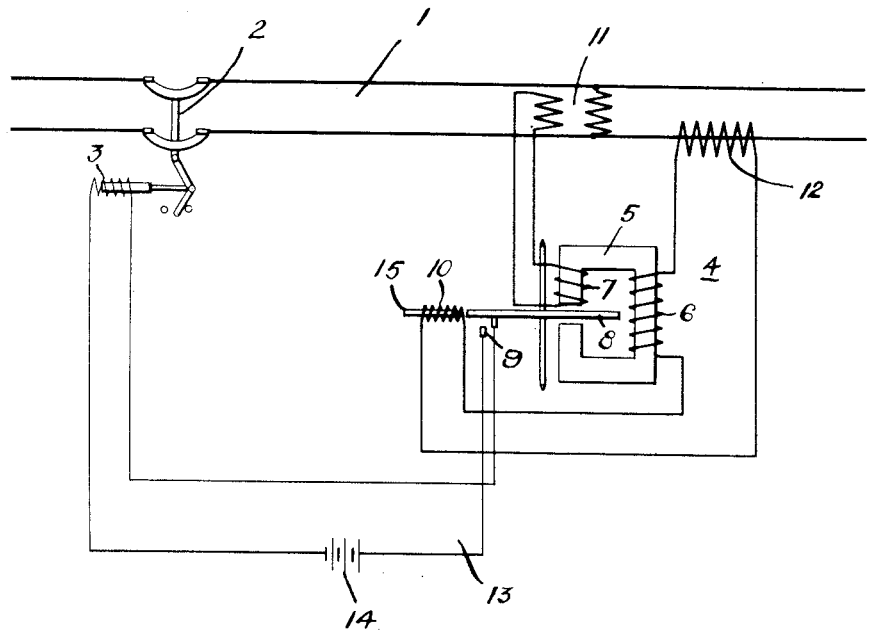
WITNESSES:
Ed. V. Henson
JH Procter
INVENTOR
Paul MacGahan
BY
Wesley G. Carr
ATTORNEY Patented Jan. 30, 1923.

1,443,583

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL PROTECTIVE DEVICE.

Application filed March 13, 1918. Serial No. 222,054.

*To all whom it may concern:*

Be it known that I, PAUL MacGAHAN, a citizen of the United States and a resident of Pittsburgh, in the county of Allegheny and State of Pennsylvania, have invented a new and useful Improvement in Electrical Protective Devices, of which the following is a specification.

My invention relates to electrical protective devices and particularly to relays and apparatus for protecting circuit interrupters.

One object of my invention is to provide means for preventing the operation of an overload relay when the current traversing the circuit to which it is connected exceeds a predetermined value.

Another object of my invention is to provide a relay-controlling device, of the above-indicated character that may be applied to motor relays of standard types.

A further object of my invention is to provide a device of the above-indicated character that shall be simple and inexpensive to construct and effective in its operation.

In practicing my invention, I provide a motor-type overload relay for controlling the trip coil of a circuit interrupter. The winding of an electromagnet is connected in series with the winding of the relay, and the movable core member of the electromagnet is adapted to engage the armature of the relay to prevent operation thereof when the overload traversing the interrupter is of such value that, should the interrupter be tripped, it would be injured. With such a device, the interrupter may open only when the normal overloads for which it is designed traverse the circuit and is precluded from opening under excessive overload conditions.

The single feature of the accompanying drawing is a diagrammatic view of a circuit-interrupting system embodying my invention.

A circuit 1 is provided with an interrupter 2 having a trip coil 3 that is controlled by an overload relay 4.

The relay 4 comprises a magnetizable core member 5, a current winding 6, a potential winding 7, an armature 8, contact members 9 and an electromagnetic braking or holding device 10. The winding 7 is operatively connected to the circuit 1 through a potential transformer 11, and the winding 6 is connected in series with the winding of the electromagnetic braking device 10 and a transformer 12. The contact members 9 constitute the separable terminals of a circuit 13 comprising a source 14 of electromotive force and the trip coil 3. While the relay 4 is illustrated as an overload relay, it may be so connected as to constitute an excess-current relay.

The electromagnet of the braking or holding device 10 is so designed that its movable core member 15 is adapted to engage the armature 8 of the relay when a predetermined excessive current or overload traverses the circuit 1 to thereby prevent the operation of the armature and thus preclude the tripping of the interrupter 2 when current of a larger value than that for which the interrupter 2 is designed traverses the circuit. When a normal overload traverses the circuit 1, the armature 8 will be turned to effect engagement of the contact members 9 to thereby trip the interrupter 2. However, when this overload exceeds a predetermined value, the movable core member 15 of the device 10 will instantly engage the armature 8 to prevent operation of the same and thereby preclude the tripping of the interrupter 2.

My invention is of such character that it may be readily applied to motor relays of standard types without any radical change in the design of the same to thus protect the circuit interrupters of a system from being destroyed by reason of interrupting a circuit that is traversed by more current than the interrupter can safely interrupt.

My invention is not limited to the particular arrangement illustrated, as various modifications may be made therein without departing from the spirit and scope of the invention, as set forth in the appended claims.

I claim as my invention:

1. A relay comprising a magnetizable core member, an actuating winding therefor, a rotatable armature, cooperating contact members actuated by the armature, and means for preventing operation of the armature at any point of its travel when the current traversing the winding exceeds a predetermined value.

2. A relay comprising a magnetizable core member, a winding therefor, a rotatable armature, contact members controlled by the armature and means connected in series with the winding for preventing further operation of the armature when the current traversing the winding exceeds a predetermined value.

3. A relay comprising a magnetizable core member, a winding therefor, a rotatable armature, contact members controlled by the armature and an electromagnet connected in series with the winding for preventing operation of the armature at any point of its travel under predetermined overload conditions.

4. A relay comprising a magnetizable core member, a winding therefor, a rotatable armature, co-operating contact members actuated by the armature, an electromagnet winding connected in series with the relay winding and a movable core member for the electromagnet winding adapted to engage the armature at any point of its travel to prevent operation thereof under predetermined overload conditions.

5. The combination with a motor-type relay, of means connected in circuit therewith for preventing further operation of the relay under predetermined overload conditions.

6. The combination with an overload relay of the motor type, of electromagnetic means connected in circuit therewith for preventing further operation thereof when the current traversing the relay exceeds a predetermined excessive value.

7. The combination with a circuit interrupter and a trip coil therefore, of a contact-making relay operative at the end of a predetermined path of travel for controlling the circuit of the trip coil, and means for preventing further operation of the relay at any point in its path of travel when an excessive current traverses the interrupter.

8. The combination with a circuit interrupter, and a trip coil therefor, of an overload relay operable through a predetermined path of travel for controlling the circuit of the trip coil, and electromagnetic means for preventing operation of the relay beyond any point in its path of travel under predetermined overload conditions.

9. The combination with a circuit interrupter, and a trip coil therefor, of a relay operative through a predetermined range for controlling the circuit of the trip coil, and electromagnetic means for preventing operation of the relay at any point in its range of operation when the current traversing the interrupter exceeds a predetermined value.

10. The combination with a relay having a movable member for controlling the contact members thereof, of means for preventing the further operation of the movable member when the current traversing the relay exceeds a predetermined value and for releasing the movable member after the current decreases to or below such value.

11. The combination with a relay embodying a movable member having a time element in the operation thereof, of means for preventing the operation of the time-element movable member at any point in its path of movement when the relay is energized beyond a predetermined degree.

In testimony whereof, I have hereunto subscribed my name this 28th day of Feb., 1918.

PAUL MacGAHAN.